April 23, 1968  L. ELIA  3,379,469
DETACHABLE HEADLINER
Filed Feb. 21, 1966  2 Sheets-Sheet 1
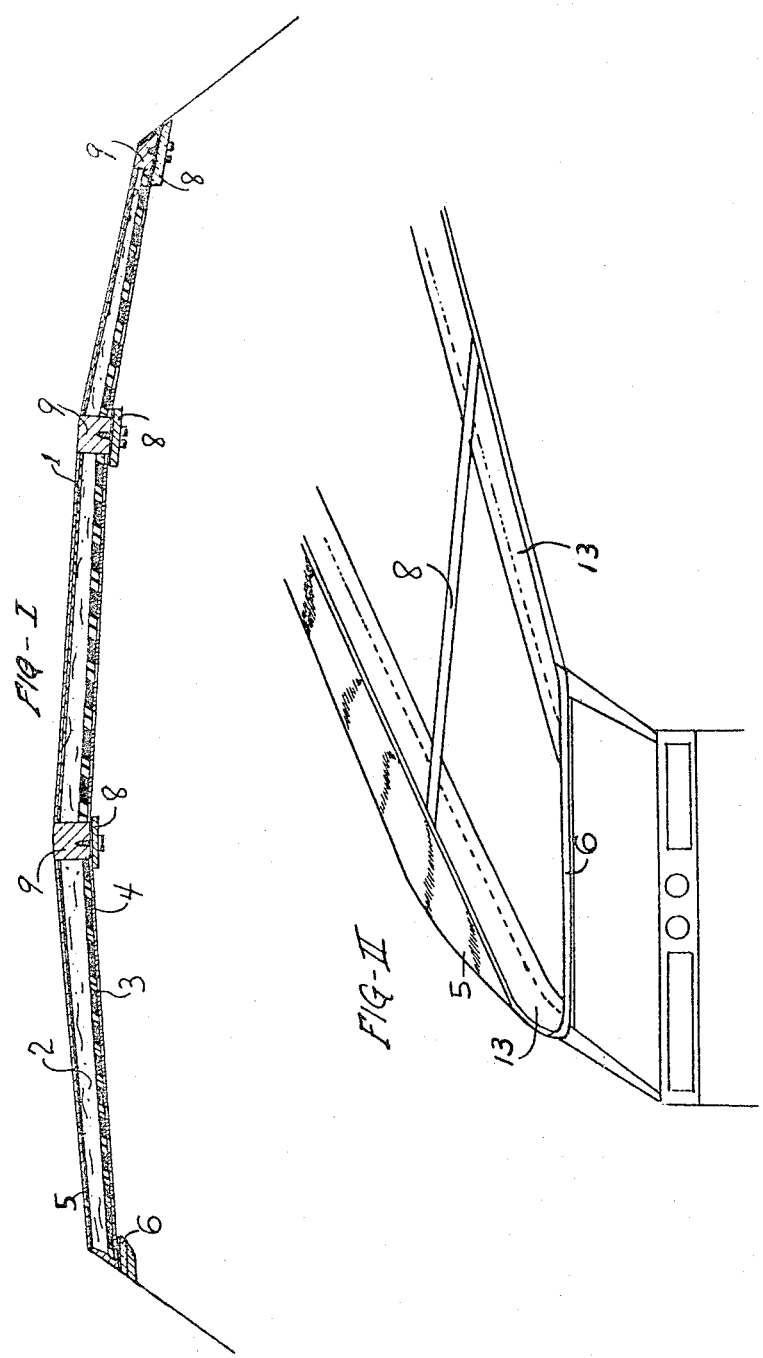
INVENTOR.
LOUIS ELIA
BY
Arne J. Fors
Agent April 23, 1968  L. ELIA  3,379,469
DETACHABLE HEADLINER
Filed Feb. 21, 1966  2 Sheets-Sheet 2
FIG. III
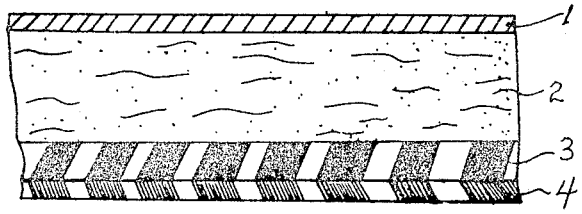
FIG. IV
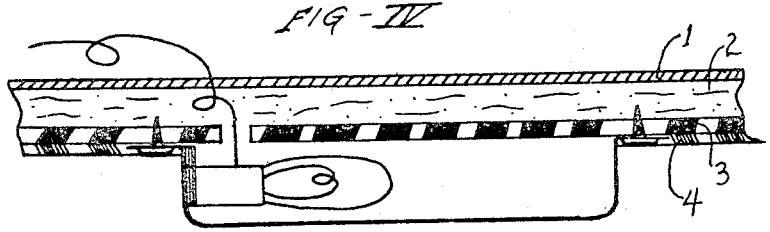
FIG. V  FIG. VI
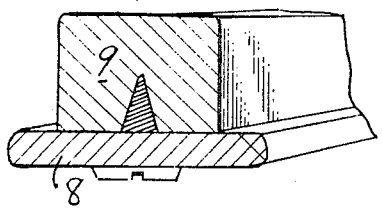 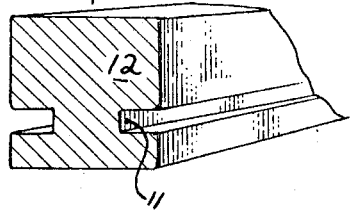
FIG. VII
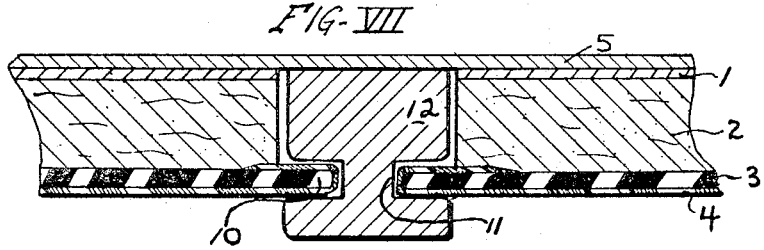
FIG. VIII
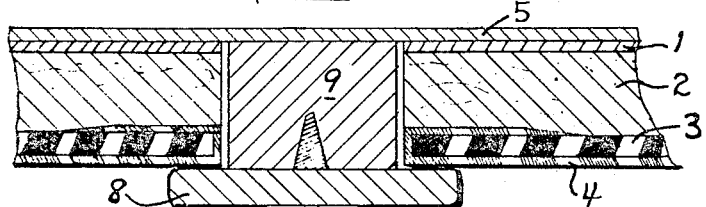
INVENTOR.
LOUIS ELIA
BY
Arne J. Fors
Agent

United States Patent Office 3,379,469
Patented Apr. 23, 1968

3,379,469
DETACHABLE HEADLINER
Louis Elia, 11 E. Haven Drive,
Scarborough, Ontario, Canada
Filed Feb. 21, 1966, Ser. No. 528,906
1 Claim. (Cl. 296—137)

ABSTRACT OF THE DISCLOSURE

A laminated removable headliner for use in a convertible supported adjacent the convertible roof with brackets attached to the roof trusses.

This invention relates to a removable insulated roof headliner panel and to means for supporting the said panel within the roof interior of a vehicle having a fabric roof assembly.

Vehicles or automobiles with fabric roofs are quite unsuited for general winter and cold weather usage due to the inefficient insular protection afforded by the fabric roof alone. Also, fabric roofs of this type do not prevent draughts and cold air turbulence within the vehicle while travelling, resulting in passenger discomfort. Another undesirable feature of a fabric roof vehicle is the ballooning of the fabric roof while travelling at high speeds.

At present, vehicles with fabric roof assemblies are not equipped with an insulated roof headliner panel or a method of fastening the said headliner within the vehicle. (Also, there is no provision for a roof dome-light to provide such vehicles with interior overhead lighting.)

It is an object of the present invention to provide a roof headliner panel for use as an additional insert in the roof interior of convertible automobiles or vehicles with fabric roof assemblies and to means for supporting the said panel.

I have found that the disadvantages of a fabric roof assembly may be overcome by providing a detachable insulated roof headliner which comprises a substantially rigid panel, an insular material co-extensive with and secured to one side of the panel, a layer of pliable material overlying the insular material and adapted for use as a vapour barrier, and means for detachably securing the insulated headliner in abutting relationship with the underside of the said convertible top wherein the pliable material abuts the convertible top. This detachable panel preferably consists of a tempered fiberboard or a relatively rigid sheet of plastic material which acts as the foundation layer. Secured to the panel is a layer of soft insulation and the insulation is covered with a layer of pliable material or paper foil which acts as a vapour barrier. This pliable paper barrier material preferably consists of a thin flexible plastic film such as polyethylene which is adjacent the roof fabric when assembled and serves as a protective covering for the soft insulation to prevent water damage resulting from seepage through the fabric roof during use, and to protect the insulation from dirt and disintegration during off-season storage. The vapour barrier material is adjacent to the fabric roof when assembled, and serves as a sanitary protective covering for the soft insulation during storage and in off-season use. The said vapour barrier also provides ease of installation and cleanliness to the roof fabric interior. The layer of soft insulation used in this panel may be glass fiber matted cloth fabric, or any soft composition material.

The surface of the panel which views into the vehicle interior may be provided with a finished surface or decorated with cloth or plastic fabric to match the vehicle interior. This removable roof headliner panel is cut and made to sizes conforming to the interior roof sections.

Another feature of the invention is that during cold weather the heat from the vehicle interior will not come in contact with the fabric roof material causing snow or ice to melt on the roof. Also, the contraction and expansion in the roof fabric material caused by a warm internal surface and a cold external surface is eliminated and this feature will prevent shrinkage and prolong the life of the fabric roof material.

The invention is described with reference to the accompanying drawings wherein:

FIGURE I is a cross-sectional view of the insulated headliner shown installed in a vehicle fabric roof assembly.

FIGURE II is a partial perspective of the vehicle roof interior showing the invention installed.

FIGURE III is a cross-sectional view through a portion of the panel showing the embodiments of the invenion on an enlarged scale.

FIGURE IV is a cross-sectional view of the detachable headliner showing a dome-light with its electric supply wire.

FIGURE V is a cross-sectional isometrical view of a roof truss with the supporting bracket.

FIGURE VI is a cross-sectional isometrical view of a roof truss having a recess.

FIGURE VII is a partial cross-sectional view of the headliner in use with a recessed roof truss.

FIGURE VIII is a partial cross-sectional view of the roof panel shown supported by means of a bracket connected to the roof truss.

As will be seen most clearly in FIGURE 3, the headliner comprises a relatively rigid panel 3, preferably of fiberboard, which forms the foundation for the headliner. The panel 3 has a layer of soft insulation material 2 adhered to the top side of the insulation layer by means of waterproof latex adhesive or glue. A vapour barrier 1 preferably consisting of a thin flexible plastic film such as polyethylene is adhesively secured to the insulation material 2, whereby the vapour barrier 1 is in contact and adjacent to the underside of the fabric roof 5. This vapour barrier serves as a sanitary protective covering for the soft insulation during storage and in off season use, and it also permits easier installation of the headliner. The side of the sheet fiberboard 3 remote from insulation material 2 is prefinished or decorated with a lamination of cloth or plastic fabric which exhibits to view and matches the interior of the vehicle. The laminar thickness of the soft insulation and vapour barrier material together is substantially greater than that of the foundation lamination.

It will be seen from FIGURE 1 that the insulated headliner consists of a plurality of panels, one of which is retained in abutting relationship with the roof fabric by means of the fabric frame 6 and a bracket 8 which is secured to the underside of roof truss 9. In a similar manner, the other panels are retained in position by brackets 8, fastened to each roof truss 9 forming part of the convertible roof frame.

A further embodiment of the invention is shown in FIGURES VI and VII wherein panel 3 projects beyond the insular material 2 forming a flange 10 which is adapted for engagement with recess 11 in roof truss 12 as shown in FIGURE VII.

To install the invention of the instant application, the leading edge of the forward panel is inserted between the roof fabric and the fabric frame 6. For a proper fit, it is necessary to slide the leading edge of the forward panel under frame 6, and then to position the panel within the roof structure in order that the side edges of the panel may be inserted between supporting fabric 13 and roof fabric 5. Positioning of the panels adjacent the fabric roof would be difficult because of the fibrous nature of both the insulating material and the fabric roof material which prevents free movement of the panel over the roof fabric. However, the glossy surface of the vapour barrier permits easy sliding movement of each panel relative to the roof fabric, for proper positioning to permit easier installation. The trailing edge is secured in position by means of bracket 8, and the remaining panels are positioned and secured in a similar manner using brackets 8 at each roof truss.

What I claim as new and desire to protect by Letters Patent of the United States is:

1. A convertible top comprising a roof; transverse roof trusses at least one of which has a longitudinal recess formed therein; an insulated headliner comprising a plurality of substantially rigid panels for insertion adjacent the underside of the convertible top, an insular material co-extensive with and adhesively secured to one side of each of said panels, a layer of pliable plastic film overlying the insular material and adapted for use as a vapour barrier, said rigid panels having at least one edge projecting beyond the insular material for defining a flange; means for detachably securing said insulated headliner to said roof whereby said insulated headliner is in abutting relationship with the underside of said roof and whereby said plastic film abuts said roof, said detachably securing means comprising said flange being received within said longitudinal recess and a bracket extending transverse said convertible top fastened to the underside of said roof trusses adapted to support the edge opposite the flange of the insulated headliner.

References Cited

UNITED STATES PATENTS

| | | | |
|---|---|---|---|
| 2,077,262 | 4/1937 | Prudden | 296—137 |
| 2,418,918 | 4/1947 | Yankus | 296—137 |
| 2,428,591 | 10/1947 | Slayter | 296—137 X |
| 2,527,299 | 10/1950 | De Phillips | 154—50 |
| 2,674,488 | 4/1954 | Lyijynen et al. | 196—137 |
| 2,705,557 | 4/1955 | Hartman | 154—50 X |
| 3,015,596 | 1/1962 | Couch et al. | 161—61 X |
| 3,074,520 | 1/1963 | Grubelich | 49—475 X |

BENJAMIN HERSH, *Primary Examiner.*

J. SIEGEL, *Assistant Examiner.*